United States Patent

Kudo

Patent Number: 5,978,147
Date of Patent: Nov. 2, 1999

[54] IMMERSION MICROSCOPE OBJECTIVE

[75] Inventor: Shintaro Kudo, Kawasaki, Japan

[73] Assignee: Nikon Corporation, Tokyo, Japan

[21] Appl. No.: 09/134,203

[22] Filed: Aug. 14, 1998

[30] Foreign Application Priority Data

Sep. 9, 1997 [JP] Japan ................................. 9-261061

[51] Int. Cl.⁶ .................................................. G02B 21/02
[52] U.S. Cl. ........................................................ 359/656
[58] Field of Search .................................. 359/656, 657, 359/658, 659, 660, 661

[56] References Cited

U.S. PATENT DOCUMENTS 5,636,058  6/1997  Amemiya ................................ 359/656

*Primary Examiner*—Scott J. Sugarman
*Attorney, Agent, or Firm*—Downs Rachlin & Martin PLLC

[57] ABSTRACT

A high-magnification immersion microscope objective 10 capable of being fabricated relatively easily, and wherein field flatness is well-corrected and the image quality is good even at the periphery of the field. The microscope objective comprises, objectwise to imagewise, a first lens group G1 having positive refractive power, a second lens group G2 having positive refractive power, and third lens group G3 having negative refractive power. First lens group includes four single positive lenses (L11 to L14), and second lens group G2 has a plurality of cemented lenses (L21 and L22). The microscope objective preferably satisfies at least one of a number of design conditions.

8 Claims, 5 Drawing Sheets

IMMERSION MICROSCOPE OBJECTIVE

FIELD OF THE INVENTION

The present invention relates to an immersion microscope objective, and more particularly to a high-magnification immersion microscope objective having a relatively flat field and good image quality even at the periphery of the field.

BACKGROUND OF THE INVENTION

The greater the magnification of a microscope objective, the smaller its focal length and the greater its refractive power. Consequently, correcting of the Petzval sum, a measure of the field (i.e., image plane) flatness, becomes difficult. In particular, since the refractive index differential across the most objectwise lens surface (i.e., the boundary surface or interface between the most objectwise lens and the immersion fluid) of an immersion objective is small, correction of the Petzval sum is difficult. Conventional microscope objective designs are such that correction of the Petzval sum and correction of chromatic aberration are mutually opposing so that simultaneous correction of both is difficult to achieve. In other words, if correcting the Petzval sum is emphasized, correcting chromatic aberration is difficult, and visa versa.

For example, increasing the lens diameter to increase the paraxial ray height h serves to correct the Petzval sum, since the radius of curvature of each lens surface can be increased. However, this approach is disadvantageous for correcting chromatic aberration, since the chromatic aberration coefficient is proportional to the square of paraxial ray height h. This results in residual chromatic aberration (e.g., secondary spectrum, and the like) which increases as the paraxial ray height h increases.

In addition, since the numerical aperture (NA) is generally large in a high-magnification microscope objective, spherochromatism and coma increase.

Thus, the ability to simultaneously correct the various aberrations, including chromatic aberrations and Petzval sum, is extremely difficult in present-day high-magnification immersion microscope objectives.

High-magnification immersion objectives are disclosed in Japanese Patent Application Kokai No. Hei 7-230039 and Japanese Patent Application Kokai No. Hei 7-281097. In the immersion objectives disclosed therein, a cemented lens having an embedded lens is arranged most objectwise. The Petzval sum is reduced and the field curvature is corrected by the radius of curvature and the refractive index differential across the cemented surface of the embedded lens.

On the other hand, in Japanese Patent Application Kokai No. Sho 58-192013, Japanese Patent Application Kokai No. Sho 61-275813 (Japanese Patent Application Kokoku No. Hei 5-67004) and in Working Example 1 of Japanese Patent Application Kokai No. Hei 5-142477, lens systems are disclosed that do not use an embedded lens to correct the Petzval sum.

The configurations disclosed in the abovementioned Japanese Patent Applications Kokai No. Hei 7-230039 and Kokai No. Hei 7-281097 and other like configurations are quite useful from the viewpoint of optical design. Particularly with apochromats, there are many cases of its use in objectives requiring a large NA. In actuality, however, there are practical difficulties from the viewpoint of actually fabricating the lens. In particular, the curvature of the concave surface on the embedded side of an embedded lens (i.e., the surface that contacts the embedded lens) becomes quite strong. Thus, not only does fabrication of this concave surface become difficult, but fabrication time and cost tend to increase. In addition, since the imagewise convex surface, which is the embedded side of the embedded lens, is often nearly hemispherical or beyond, it is difficult to polish this convex surface with high accuracy. The higher the magnification of the objective, the smaller its focal length, and the stronger the curvature of the abovementioned concave surface, and convex surface and the more difficult the lens is to fabricate.

On the other hand, in the lens systems disclosed the abovementioned Japanese Patent Applications Kokai No. Sho 58-192013, Kokai No. Sho 61-275813 (Japanese Patent Application Kokoku No. Hei 5-670004) and Kokai No. Hei 5-142477 (Working Example 1), balancing the correction of the Petzval sum with the correction of chromatic aberration and the like is inevitably sacrificed to the extent the Petzval sum is not corrected by the embedded lens.

SUMMARY OF THE INVENTION

The present invention relates to an immersion microscope objective, and more particularly to a high-magnification immersion microscope objective having a relatively flat field and good image quality even at the periphery of the field.

To achieve the above goals, the immersion microscope objective of the present invention comprises, objectwise to imagewise, a first lens group having positive refractive power, a second lens group having positive refractive power, and a third lens group G3 having negative refractive power. The first lens group includes four single positive lenses, and the second lens group includes a plurality of cemented lenses.

In one aspect of the present invention, the second lens group has a triplet cemented lens comprising, objectwise to imagewise, a positive lens, a negative lens and a positive lens. In addition, it is preferred that the following design condition be satisfied:

$1.2 < f_1/f < 3.5$ wherein $f_1$ is the focal length of first lens group, and f is the overall focal length of the microscope objective.

In another aspect of the invention, the following condition is satisfied:

$5 < |f_3|/f < 25$ wherein $f_3$ is the focal length of third lens group G3.

DETAILED DESCRIPTION OF THE INVENTION

The present invention takes the abovementioned design and fabrication problems into consideration, and has the goal of providing a high-magnification immersion microscope objective wherein lens fabrication is comparatively simple, field flatness is well-corrected, and the image quality is good even at the periphery of the field.

As discussed above, a high-magnification microscope objective generally has a large NA. Generally speaking, the first lens group of a high-magnification microscope objective must have a strong positive refractive power, because a high-NA light beam must be strongly converged. This can be seen in microscope objective 10 of FIG. 1, comprising lens-groups G1–G3. In this case, an increase in the refractive index of the lenses comprising first lens group G1 is advantageous for suppressing an increase in the Petzval sum. Nevertheless, based on the physical properties of optical materials, since the dispersion of a lens inevitably increases as the refractive index increases, chromatic aberration, and more particularly secondary spectrum cannot be completely corrected. Conversely, if a lens is constructed using optical materials having a small dispersion, the refractive index is low and, consequently, the curvature of the lens surface is greater, which increases the Petzval sum.

Figure 1:
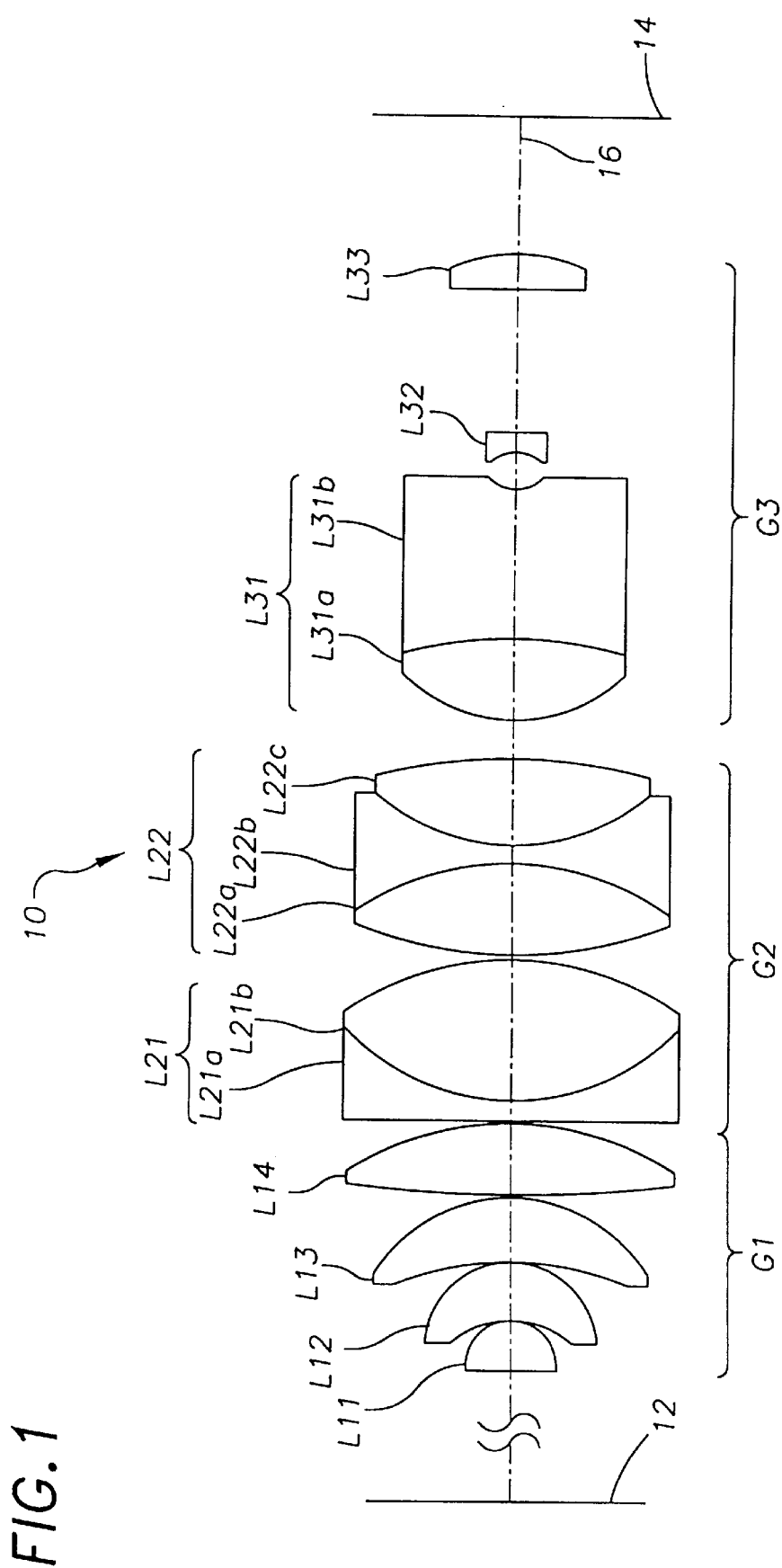
FIG. 1. is an optical diagram of Working Example 1 of the immersion microscope of the present invention.

With continued reference to FIG. 1, to provide the strong refractive power required by first lens group G1 while simultaneously suppressing an increase in the Petzval sum, in a preferred embodiment of the present invention, first lens group G1 is configured so that it has at least four positive single lenses (i.e., lens elements) L11 through L14. Further, these lens elements are configured such that the curvature of each lens surface is weak by apportioning the refractive power in each positive lens element. This configuration avoids the special fabrication shapes required in conventional embedded lenses, thereby simplifying lens fabrication.

Furthermore, the correction of chromatic aberration suffers when emphasis is given to reducing the Petzval sum in the configuration of first lens group G1. Accordingly, to correct spherochromatism and on-axis chromatic aberration in second lens group G2, in another preferred embodiment of the present invention, a configuration having a plurality of cemented lenses (e.g., lenses L21 and L22) in lens group G2 is adopted.

With continuing reference to FIG. 1, in a further preferred embodiment of the present invention, a lens group G3 having negative refractive power is arranged imagewise of the two positive refractive power lens groups G1 and G2. This allows for the overall refractive power of the microscope objective 10 to be properly distributed, the desired magnification to be obtained, and the Petzval sum to be corrected for field flatness. Since a light beam passing through third lens group G3 is narrower than when it passes through first and second lens groups G1 and G2, the impact on spherical aberration and the like is small, and correction of field curvature can be obtained.

In another preferred embodiment of the present invention, second lens group G2 includes a triplet cemented lens comprising, objectwise to imagewise, a positive lens, a negative lens and a positive lens. As described above, second lens group G2 corrects chromatic aberration generated particularly by first lens group G1. Accordingly, if correcting chromatic aberration is emphasized, second lens group G2 can also be configured to include a plurality of doublet cemented lenses. Nevertheless, by second lens group G2 having a positive-negative-positive triplet cemented lens, it is possible to correct chromatic aberration with good efficiency without increasing the lens thickness of second lens group G2.

Since the overall length of the microscope objective is controlled by the mechanical configuration of the microscope body, additional leeway in the lens thickness of third lens group G3 can be created to the extent that the lens thickness of second lens group G2 can be reduced. Accordingly, it becomes unnecessary to adopt a configuration wherein the light beam converges abruptly in a short distance in third lens group G3 to correct the Petzval sum. Moreover, the amount of coma generated by third lens group G3 can be controlled. The simultaneous correction of coma and Petzval sum thus becomes possible, and a reduction in image quality at the periphery of the field can be prevented.

In another preferred embodiment of the present invention, to achieve simultaneous correction of the Petzval sum and chromatic aberration with good balance, all the positive lenses in first lens group G1 have an Abbe number equal to or greater than 50.

To meet the above-described goals, it is preferable that the present invention satisfy at least one of a number of design conditions set forth below.

For instance, in addition to the abovementioned configuration, it is preferable that the present invention satisfy the following design condition (1):

$$1.2 < f_1/f < 3.5 \tag{1}$$

wherein $f_1$, is the focal length of first lens group G1, and f is the overall focal length of the microscope objective. Condition (1) stipulates an appropriate range for the focal length of first lens group G1. If $f_1/f$ falls below the lower limit in condition (1), the refractive power of first lens group G1 increases excessively and the correction of the Petzval sum become inadequate. Correction of coma also becomes difficult. Conversely, if $f_1/f$ exceeds the upper limit in condition (1), the refractive power of first lens group G1 decreases excessively and correction of spherochromatism becomes difficult, even though it is beneficial for correcting the Petzval sum.

It is also preferable that the present invention to satisfy the following design condition (2):

$$5 < |f_3|/f < 25 \tag{2}$$

wherein $f_3$ is the focal length of third lens group G3. Condition (2) stipulates an appropriate range for the focal length of third lens group G3. If $|f_3|/f$ falls below the lower limit in condition (2), the refractive power of third lens group G3 increases excessively and the correction of coma becomes difficult, even though it is beneficial for correcting the Petzval sum. Conversely, if $|f_3|/f$ exceeds the upper limit in condition (2), the refractive power of third lens group G3 decreases excessively and the Petzval sum can no longer be adequately corrected, even though it is beneficial for correcting coma.

It is further preferable that the present invention satisfy the following design condition (3):

$$1.0 < f_{11}/f < 3.5 \tag{3}$$

wherein $f_{11}$ is the focal length of most objectwise lens L11 in first lens group G1.

As mentioned above, since the NA of the microscope objective of the present invention is large, to maintain good image quality of the periphery of the field, it is critical to satisfactorily correct coma and the Petzval sum. Accordingly, it is preferable in the present invention to take into consideration the reduction in image quality at the periphery of the field due to sagittal coma generated by the imagewise surface of most objectwise positive lens L11 in first lens group G1. Further, it is preferable to stipulate a range for the refractive power of positive lens L11 suited to the correction of sagittal coma. Thus, condition (3) stipulates an appropriate range for the focal length of most objectwise lens L11 in first lens group G1.

If $f_{11}/f$ falls below the lower limit in condition (3), the refractive power of positive lens L11 increases excessively and the Petzval sum is insufficiently corrected (i.e., becomes too large). Also, the correction of sagittal coma becomes difficult. Conversely, if $f_{11}/f$ exceeds the upper limit in condition (3), the refractive power of positive lens L11 decreases excessively and the correction of secondary spectrum and the like becomes difficult, even though it is beneficial for correcting Petzval sum and sagittal coma.

Working Examples

In each Working Example, the immersion microscope objective of the present invention comprises a first lens group G1 having positive refractive power, a second lens group G2 having positive refractive power, and a third lens group G3 having negative refractive power. Further, first lens group G1 comprises four single positive lens elements, and second lens group G2 comprises two cemented lenses (see, e.g., microscope objective 10 of FIG. 1).

The microscope objective in each Working Example is an immersion type that uses oil as the immersion liquid. The D-line ($\lambda$=587.6 nm) refractive index of the oil immersion liquid in the Working Examples is 1.51536, and the Abbe number of the oil immersion liquid is 41.361. Also, the thickness of the cover glass in each Working Example is 0.17 mm, the D-line refractive index of the cover glass is 1.52216, and the Abbe number of the cover glass is 58.802.

Furthermore, since the microscope objective in each Working Example is designed for focus at infinity, an image-forming lens system (i.e., a second objective lens) is arranged imagewise of the microscope objective, and the microscope objective and image-forming lens system are used in combination.

Aberration plots 2a–d and 4a–d for Working Examples 1 and 2, respectively, are for the case wherein the on-axis air space between the microscope objective and the image-forming lens system lens is 140 mm. However, the present inventors have verified that there is nearly no fluctuation of aberration even if this on-axis air space changes to some extent.

Figure 5:
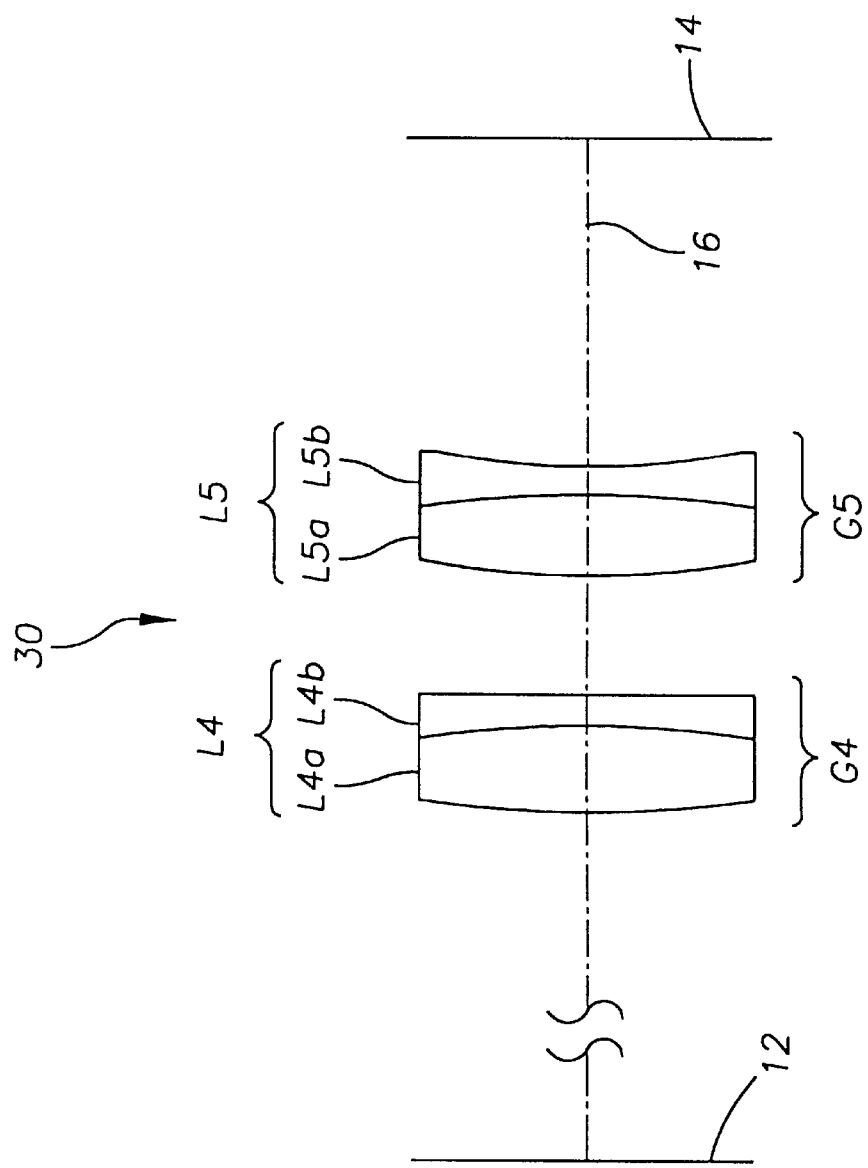
FIG. 5 is an optical diagram of the image forming lens system used in Working Examples 1 and 2.

With reference now to FIG. 5, image formation optical system 30 comprises, from object plane 12 to image plane 14 along optical axis 16 (i.e., objectwise to imagewise), a fourth lens group G4 having a cemented positive lens L4 comprising a biconvex lens L4a and a biconcave lens L4b, and a fifth lens group G5 having a cemented positive lens L5 having a biconvex lens L5a and a biconcave lens L5b.

The following Table 1 lists the design values of image-forming lens system 30. In Table 1, as well as in Tables 2a and 3a, below, S indicates the lens surface number (objectwise to imagewise), r indicates the radius of curvature of each lens surface, d indicates the spacing between adjacent lens surfaces, n indicates the D-line ($\lambda$=587.6 nm) refractive index, and v indicates the Abbe number. Also, in Tables 2a and 3a, f indicates the overall focal length of the microscope objective, NA indicates the numerical aperture, $\beta$ indicates the magnification when the image formation lens system is used, and WD indicates the working distance.

TABLE 1

DESIGN TABLE

| S | r | d | n | v | |
|---|---|---|---|---|---|
| 1 | 75.0430 | 5.10 | 1.62280 | 57.033 | (G4) |
| 2 | −75.0430 | 2.00 | 1.74950 | 35.189 | |
| 3 | 1600.5800 | 7.50 | | | |
| 4 | 50.2560 | 5.10 | 1.66755 | 41.963 | (G5) |
| 5 | −84.5410 | 1.80 | 1.61266 | 44.402 | |
| 6 | 36.9110 | | | | |

Figure 2:
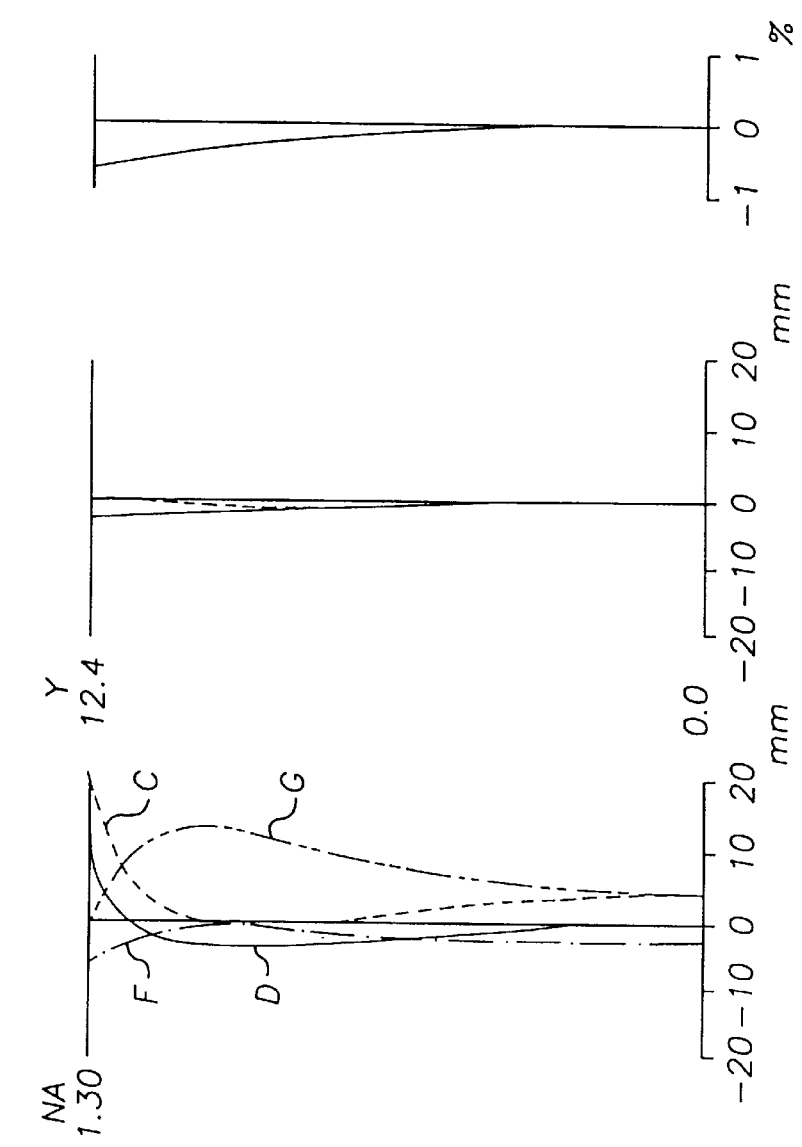
FIGS. 2a–d are aberration plots for spherical aberration, astigmatism, distortion, and coma, respectively, of Working Example 1.
Figure 4:
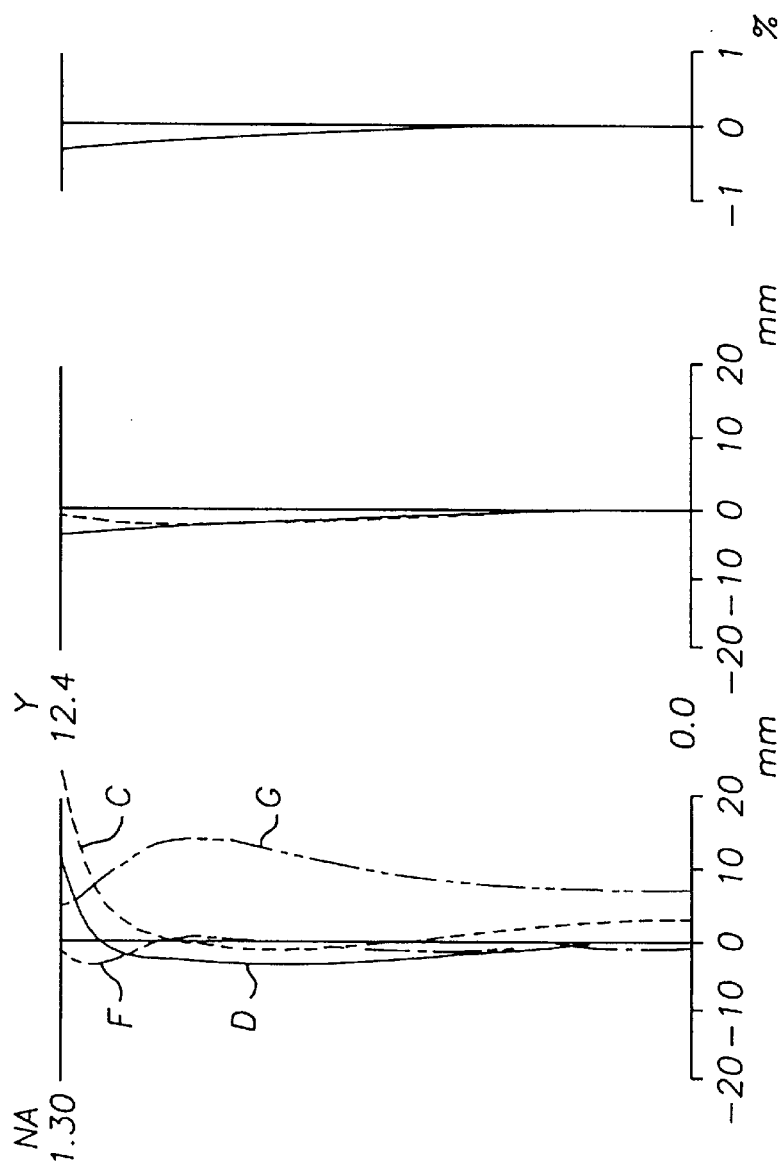
FIG. 4a–d are aberration plots for spherical aberration, astigmatism, distortion, and coma, respectively, of Working Example 2.

In the aberration plots (FIGS. 2a–d and 4a–d), Y indicates the image height, D indicates the D-line ($\lambda$=587.6 nm), C indicates the C-line ($\lambda$=656.3 nm), F indicates the F-line ($\lambda$=486.1 nm), and G indicates the G-line ($\lambda$=435.8 nm). In the astigmatism plots (FIGS. 2b and 4b) and the distortion plots (FIGS. 2c and 4c), the reference ray is the D-line reference ray. Furthermore, in the astigmatism plots, the solid line indicates the sagittal image plane, and the broken line indicates the meridional image plane. In addition, the coma plots (FIGS. 2d and 4d) show coma at an image height of Y=9.

Working Example 1

With reference to FIG. 1 and microscope objective 10, first lens group G1 comprises, from object plane 12 to image plane 14 along an optical exist 16 (i.e., objectwise to imagewise), a planoconvex lens L11 having an objectwise planar surface, a positive meniscus lens L12 having an objectwise concave surface, a positive meniscus lens L13 having an objectwise concave surface, and a biconvex lens L14.

Second lens group G2 comprises, objectwise to imagewise, a doublet cemented positive lens L21 comprising a biconcave lens L21a and a biconvex lens L21b, and a triplet cemented positive lens L22 comprising a biconvex lens L22a, a biconcave lens L22b and a biconvex lens L22c.

Third lens group G3 comprises, objectwise to imagewise, a cemented negative lens L31 comprising a biconvex lens L31a and a biconcave lens L31b, a biconcave lens L32 having a strongly negative refractive power due to strongly curved objectwise surface, and biconvex lens L33.

The following Tables 2a–b lists the design values and design condition values, respectively, for microscope objective 10 of Working Example 1 of the present invention. Note that in Table 2a, the Abbe numbers of all the positive lenses (L11 to L14) in first lens group G1 are 50 or greater.

TABLE 2a

DESIGN VALUES
f = 2
NA = 1.3
$\beta$ = 100
WD = 0.24

| S | r | d | n | v | GROUP |
|---|---|---|---|---|---|
| 1 | ∞ | 2.65 | 1.51823 | 58.903 | (G1) |
| 2 | −2.4297 | 0.10 | | | |
| 3 | −5.4502 | 2.80 | 1.49782 | 82.516 | |
| 4 | −4.6102 | 0.10 | | | |
| 5 | −17.0995 | 3.10 | 1.49782 | 82.516 | |
| 6 | −8.2704 | 0.15 | | | |
| 7 | 81.5350 | 3.55 | 1.49782 | 82.516 | |
| 8 | −16.2608 | 0.15 | | | |
| 9 | −849.8300 | 0.90 | 1.52682 | 51.352 | (G2) |

TABLE 2a-continued

DESIGN VALUES
f = 2
NA = 1.3
β = 100
WD = 0.24

| S | r | d | n | ν | GROUP |
|---|---|---|---|---|---|
| 10 | 11.8003 | 7.20 | 1.43385 | 95.247 | |
| 11 | −15.3747 | 0.20 | | | |
| 12 | 21.1997 | 4.85 | 1.43385 | 95.247 | |
| 13 | −14.7404 | 0.90 | 1.61266 | 44.405 | |
| 14 | 10.7507 | 4.35 | 1.43385 | 95.247 | |
| 15 | −28.0950 | 2.00 | | | |
| 16 | 8.2497 | 4.10 | 1.49782 | 82.516 | (G3) |
| 17 | −29.5100 | 7.65 | 1.52682 | 51.352 | |
| 18 | 2.8018 | 1.95 | | | |
| 19 | −2.4297 | 1.00 | 1.51823 | 58.903 | |
| 20 | 136.2550 | 6.90 | | | |
| 21 | 63.0110 | 1.75 | 1.57501 | 41.421 | |
| 22 | −12.6101 | | | | |

TABLE 2b

DESIGN CONDITION VALUES (1) $f_1/f = 2.482$
(2) $|f_3|/f = 8.122$
(3) $f_{11}/f = 2.338$

FIGS. 2*a*–*d* are aberration plots for microscope objective 10 of Working Example 1 of the present invention. As is clear from each aberration plot, it can be seen that the various aberrations are satisfactorily corrected in Working Example 1. In particular, it can be seen that spherical aberration and coma are satisfactorily corrected across the wide wavelength range from the G-line to the C-line. In addition, the Petzval sum in Working Example 1 is a small amount (i.e., 0.036). Accordingly, in microscope objective 10 of Working Example 1, the field is sufficiently flat and the image quality is good even at the periphery of the field.

Working Example 2

Figure 3:
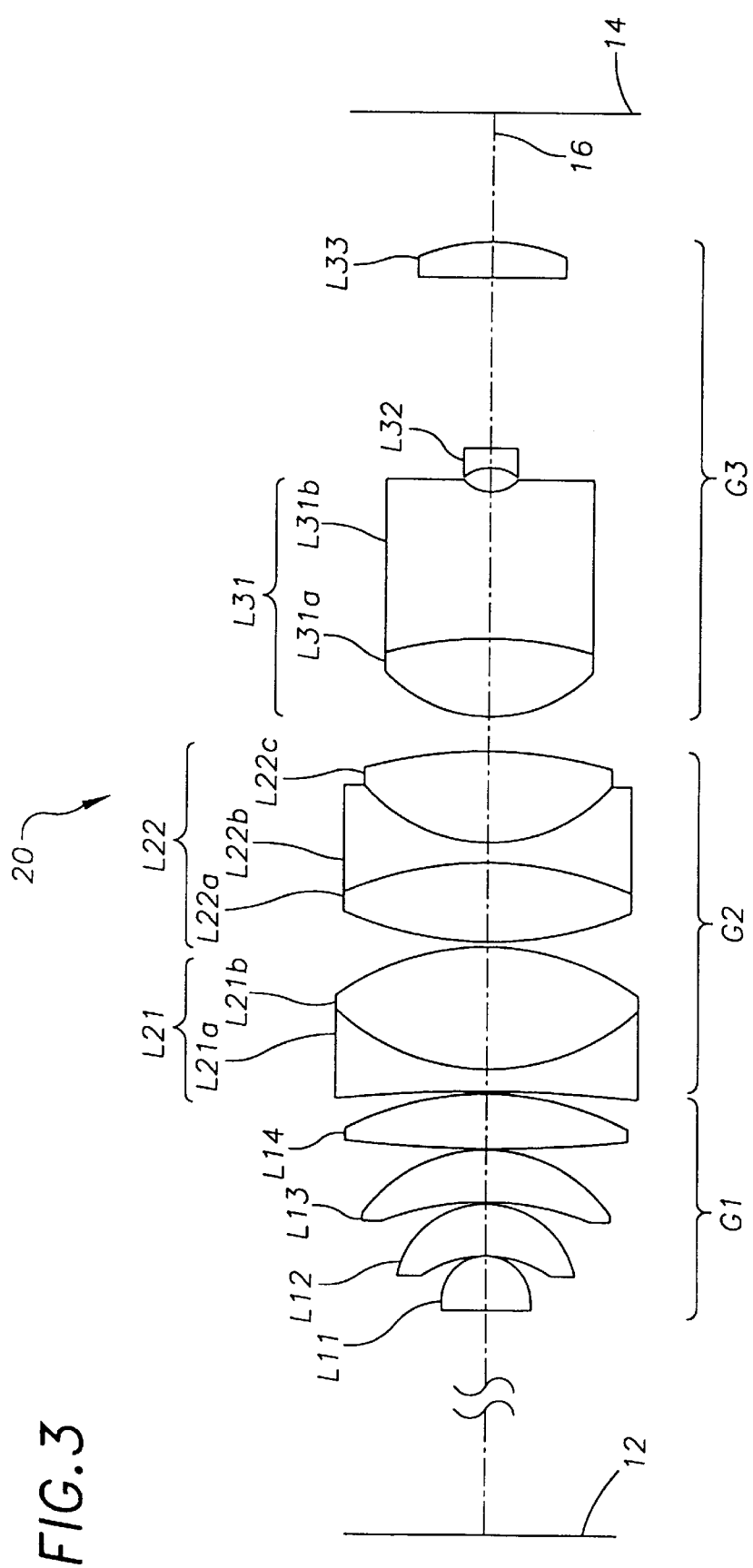
FIG. 3 is an optical diagram of Working Example 2 of the immersion microscope of the present invention.

With reference to FIG. 3 and microscope objective 20, first lens group G1 comprises, from object plane 12 to image plane 14 along optical axis 16 (objectwise to imagewise), a planoconvex lens L11 having an objectwise planar surface, a positive meniscus lens L12 having an objectwise concave surface, a positive meniscus lens L13 having an objectwise concave surface, and a biconvex lens L14.

Second lens group G2 comprises, objectwise to imagewise, a doublet cemented positive lens L21 comprising a biconcave lens L21*a* and a biconvex lens L21*b*, and triplet cemented positive lens L22 comprising a biconvex lens L22*a*, a biconcave lens L22*b* and a biconvex lens L22*c*.

Third lens group G3 comprises, objectwise to imagewise, a cemented negative lens L31 comprising a biconvex lens L31*a* and a biconcave lens L31*b*, a biconcave lens L32 having a strongly negative refractive power due to a strongly curved objectwise surface, and biconvex lens L33.

The following Tables 3a–b lists the design values and design condition values, respectively, of microscope objective 20 of Working Example 2 of the present invention. Note that in Table 3a, the Abbe numbers of all positive lenses (L11 to L14 ) in first lens group G1 are equal to or greater than 50.

TABLE 3a

DESIGN VALUES
f = 2
NA = 1.3
β = 100
WD = 0.24

| S | r | d | n | ν | GROUP |
|---|---|---|---|---|---|
| 1 | ∞ | 2.70 | 1.51823 | 58.903 | (G1) |
| 2 | −2.3003 | 0.10 | | | |
| 3 | −6.4596 | 2.65 | 1.60300 | 65.416 | |
| 4 | −5.0303 | 0.10 | | | |
| 5 | −18.3008 | 2.80 | 1.49782 | 82.516 | |
| 6 | −8.1504 | 0.10 | | | |
| 7 | 125.7841 | 2.70 | 1.49782 | 82.516 | |
| 8 | −16.2893 | 0.10 | | | |
| 9 | −54.2889 | 0.90 | 1.52682 | 51.352 | (G2) |
| 10 | 11.2832 | 6.70 | 1.43385 | 95.247 | |
| 11 | −13.0155 | 0.20 | | | |
| 12 | 19.0260 | 4.20 | 1.43385 | 95.247 | |
| 13 | −18.0032 | 0.90 | 1.61266 | 44.405 | |
| 14 | 8.7079 | 4.60 | 1.43385 | 95.247 | |
| 15 | −22.3810 | 2.00 | | | |
| 16 | 8.0827 | 3.95 | 1.49782 | 82.516 | (G3) |
| 17 | −18.0000 | 7.59 | 1.52682 | 51.352 | |
| 18 | 2.6167 | 1.22 | | | |
| 19 | −2.4845 | 1.17 | 1.51823 | 58.903 | |
| 20 | 506.2248 | 8.75 | | | |
| 21 | 131.1915 | 1.60 | 1.57501 | 41.421 | |
| 22 | −13.6910 | | | | |

TABLE 3b

DESIGN CONDITION VALUES (1) $f_1/f = 2.214$
(2) $|f_3|/f = 8.016$
(3) $f_{11}/f = 2.211$

FIGS. 4*a*–*d* are aberration plots for microscope objective 20 of Working Example 2 of the present invention. As is clear from each aberration plot, it can be seen that the various aberrations are satisfactorily corrected in Working Example 2. In particular, it can be seen that spherical aberration and coma are satisfactorily corrected across the wide wavelength range from the G-line to the C-line. In addition, the Petzval sum in Working Example 2 is small (i.e., 0.042). Accordingly, in microscope objective 20 of Working Example 2, the field is sufficiently flat and the image quality is good even at the periphery of the field.

Each of the Working Examples set forth above explained the present invention with regard to an immersion microscope objective that uses oil as the immersion liquid. However, it will be apparent to one skilled in the art that the present invention can also be applied to a general immersion microscope objective that uses other immersion liquids, like water, for example.

As explained above, the present invention can realize a high-magnification immersion microscope objective wherein fabricating the objective is comparatively simple, field flatness is well corrected, and the image quality is good even at the periphery of the field.

While the present invention has been described in connection with preferred embodiments and Working Examples, it will be understood that it is not so limited. On the contrary, it is intended to cover all alternatives, modifications and equivalents as may be included within the spirit and scope of the invention as defined in the appended claims.

What is claimed is:

1. An immersion microscope objective capable of imaging an object, comprising, objectwise to imagewise:

a) a first lens group having positive refractive power and four single positive lens elements;

b) a second lens group having positive refractive power and a plurality of cemented lenses; and c) a third lens group having negative refractive power.

2. An immersion microscope objective according to claim 1, wherein said second lens group includes a triplet cemented lens comprising a positive lens, a negative lens and a positive lens.

3. An immersion microscope objective according to claim 1 satisfying the following condition:

$1.2 < f_1/f < 3.5$ wherein $f_1$ is the focal length of said first lens group, and f is the overall focal length of the microscope objective.

4. An immersion microscope objective according to claim 3, satisfying the following condition:

$5 < |f_3|/f < 25$ wherein $f_3$ is the focal length of said third lens group G3.

5. An immersion microscope objective according to claim 4 wherein said positive lens elements in said first lens group each have an Abbe number equal to or greater than 50.

6. An immersion microscope objective according to claim 5, wherein said first lens group includes a most objectwise lens having a focal length $f_{11}$, and the following condition is satisfied:

$1.0 < f_{11}/f < 3.5$.

7. An immersion microscope objective having an overall focal length f and capable of imaging an object, comprising, objectwise to imagewise:

a) a first lens group having positive refractive power and a focal length $f_1$, and including four single positive lens elements having Abbe numbers $v_1$, $v_2$, $v_3$, and $v_4$, respectively, wherein one of said positive lens elements is disposed most objectwise and has a focal length $f_{11}$;

b) a second lens group having positive refractive power and a plurality of cemented lenses;

c) a third lens group having negative refractive power and a focal length $f_3$; and d) wherein at least one of the following design conditions is satisfied:
   $1.2 < f_1/f < 3.5$
   $5 < |f_3|/f < 25$
   $v_1$ through $v_4 \geq 50$
   $1.0 < f_{11}/f < 3.5$.

8. An immersion microscope objective according to claim 7, wherein said second lens group includes a triplet cemented lens comprising a positive lens, a negative lens and a positive lens.

* * * * *

UNITED STATES PATENT AND TRADEMARK OFFICE
CERTIFICATE OF CORRECTION

PATENT NO: 5,978,147

DATED: November 2, 1999

INVENTOR(S): Shintaro KUDO

It is certified that errors appear in the above-identified patent and that said Letters Patent is hereby corrected as shown below:

In claim 7, column 10, line 20, delete "$5<|f_3|f<25$" and insert -- $5<|f_3|/f<25$ --.

Signed and Sealed this

Twenty-fifth Day of July, 2000

Attest:

Q. TODD DICKINSON

*Attesting Officer*

*Director of Patents and Trademarks*